UNITED STATES PATENT OFFICE.

CARRIE BRIGHTMAN, OF CRITTENDEN COUNTY, KENTUCKY.

IMPROVEMENT IN MEDICAL COMPOUNDS FOR TREATMENT OF DYSPEPSIA.

Specification forming part of Letters Patent No. 131,048, dated September 3, 1872.

Specification describing a certain Compound called "Magic Bitters," invented by CARRIE BRIGHTMAN, in the county of Crittenden and State of Kentucky, to be used in the treatment of dyspepsia, derangement of the stomach, and indigestion.

The nature of this invention of the said CARRIE BRIGHTMAN consists in mixing pulverized root of the plant known as "magic plant" with pure whisky, as follows: Take the root of the magic plant and lay it in the sun, or in some dry place, until thoroughly dried. When thoroughly dry pulverize the root in a mortar until reduced to a fine powder; then put sixty grains to a quart of pure whisky. Shake it well and it is ready for immediate use.

The proportions of magic root and whisky may be increased or diminished, according to the quantity to be made.

The magic plant was discovered about two years ago by the said CARRIE BRIGHTMAN, and has no botanical classification or name so far as she has any knowledge or information.

Dose for adults: A tea-spoonful three times a day, just before meals; to be increased gradually, as the patient may be able to bear it, to a wine-glassful three times a day.

For children: Thirty drops three times a day, increased gradually to a tea-spoonful three times a day.

I claim—

The above compound as a remedy, in the proportions and for the purposes set forth.

CARRIE BRIGHTMAN.

Witnesses:
J. W. BLUE,
S. A. BRIGHTMAN.